(12) United States Patent
Xie et al.

(10) Patent No.: US 8,482,238 B2
(45) Date of Patent: Jul. 9, 2013

(54) SYSTEM AND METHOD FOR ESTIMATING A GENERATOR ROTOR TEMPERATURE IN AN ELECTRIC DRIVE MACHINE

(75) Inventors: Bo Xie, Peoria, IL (US); Suresh B. Reddy, Dunlap, IL (US); Matt Hendrickson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 289 days.

(21) Appl. No.: 12/956,385

(22) Filed: Nov. 30, 2010

(65) Prior Publication Data
US 2012/0133313 A1 May 31, 2012

(51) Int. Cl.
*H02H 7/08* (2006.01)
*H02H 7/085* (2006.01)

(52) U.S. Cl.
CPC .................................. *H02H 7/0852* (2013.01)
USPC ........... 318/473; 318/463; 318/461; 318/462; 318/464; 318/465

(58) Field of Classification Search
CPC ................................................... H02H 7/0852
USPC ......................................... 318/473, 461–465
See application file for complete search history.

(56) References Cited

U.S. PATENT DOCUMENTS

| | | | |
|---|---|---|---|
| 5,539,601 A * | 7/1996 | Farag | 361/23 |
| 6,823,853 B2 * | 11/2004 | Clarkson et al. | 123/559.1 |
| 6,892,358 B2 * | 5/2005 | Draghetti et al. | 715/771 |
| 6,940,245 B2 | 9/2005 | Scarlet et al. | |
| 7,099,793 B2 | 8/2006 | Rechberger | |
| 2006/0250154 A1 | 11/2006 | Gao et al. | |
| 2010/0270798 A1 | 10/2010 | Poulsen et al. | |
| 2010/0276929 A1 | 11/2010 | Jansen | |

FOREIGN PATENT DOCUMENTS

| | | |
|---|---|---|
| DE | 3144174 | 6/1982 |
| JP | 2007166827 | 6/2007 |
| JP | 2008245486 | 10/2008 |
| KR | 100206657 | 7/1999 |
| WO | 2008102714 | 8/2008 |

* cited by examiner

*Primary Examiner* — Walter Benson
*Assistant Examiner* — David Luo
(74) *Attorney, Agent, or Firm* — Liell & McNeil

(57) ABSTRACT

An electric drive machine includes an electric drive system including an internal combustion engine and an electrical power generator coupled to the internal combustion engine. An electronic controller is in control communication with the electric drive system and is configured to determine an estimated temperature of a rotor of the electrical power generator at least in part by determining a rotor temperature rise estimation, compare the estimated rotor temperature to a rotor temperature threshold, and initiate an excessive temperature action if the estimated rotor temperature is greater than or equal to the rotor temperature threshold.

20 Claims, 3 Drawing Sheets

SYSTEM AND METHOD FOR ESTIMATING A GENERATOR ROTOR TEMPERATURE IN AN ELECTRIC DRIVE MACHINE

TECHNICAL FIELD

The present disclosure relates generally to estimating a generator rotor temperature in an electric drive machine, and more particularly to monitoring generator thermal status based on the estimated generator rotor temperature.

BACKGROUND

Large off-highway machines, such as, for example, mining trucks, are known to employ electric drive systems to propel or retard the machine. Typically, an electric drive system includes a generator, or other electrical power generator, such as an alternator, driven by an internal combustion engine. The generator, in turn, supplies electrical power to one or more electric drive motors connected to wheels or ground engaging tracks of the machine. It should be appreciated that a significant amount of heat is generated during the operation of the electric drive system. Specifically, the generator and the electric drive motors, along with various other electrical components, may generate a significant amount of heat and, as such, may require cooling and/or monitoring to prevent damage or failure. Although temperature sensors may be provided for some components of the electric drive system, the use of temperature sensors for rotating components, such as the generator rotor, may not be feasible due to cost and reliability concerns.

U.S. Pat. No. 7,099,793 to Rechberger appears to disclose a method for estimating a rotor temperature based on generator voltage and a static temperature characteristic map. Specifically, a field weakening controller and a limiter, along with input from a plurality of phase current sensors, are used to generate a voltage signal. This voltage signal, along with the static temperature characteristic map, is used to estimate the rotor temperature. Although a temperature estimate may be determined, the method of the Rechberger reference does not appear to account for additional parameters that may have an impact on rotor temperature.

The present disclosure is directed to one or more of the problems set forth above.

SUMMARY OF THE DISCLOSURE

In one aspect, an electric drive machine includes an electric drive system including an internal combustion engine and an electrical power generator coupled to the internal combustion engine. An electronic controller is in control communication with the electric drive system and is configured to determine an estimated temperature of a rotor of the electrical power generator at least in part by determining a rotor temperature rise estimation, compare the estimated rotor temperature to a rotor temperature threshold, and initiate an excessive temperature action if the estimated rotor temperature is greater than or equal to the rotor temperature threshold.

In another aspect, a method of operating an electric drive machine includes the steps of determining an estimated temperature of a rotor of the electrical power generator using an electronic controller at least in part by determining a rotor temperature rise estimation, comparing the estimated rotor temperature to a rotor temperature threshold using the electronic controller, and initiating an excessive temperature action using the electronic controller if the estimated rotor temperature is greater than or equal to the rotor temperature threshold.

DETAILED DESCRIPTION

Figure 1:
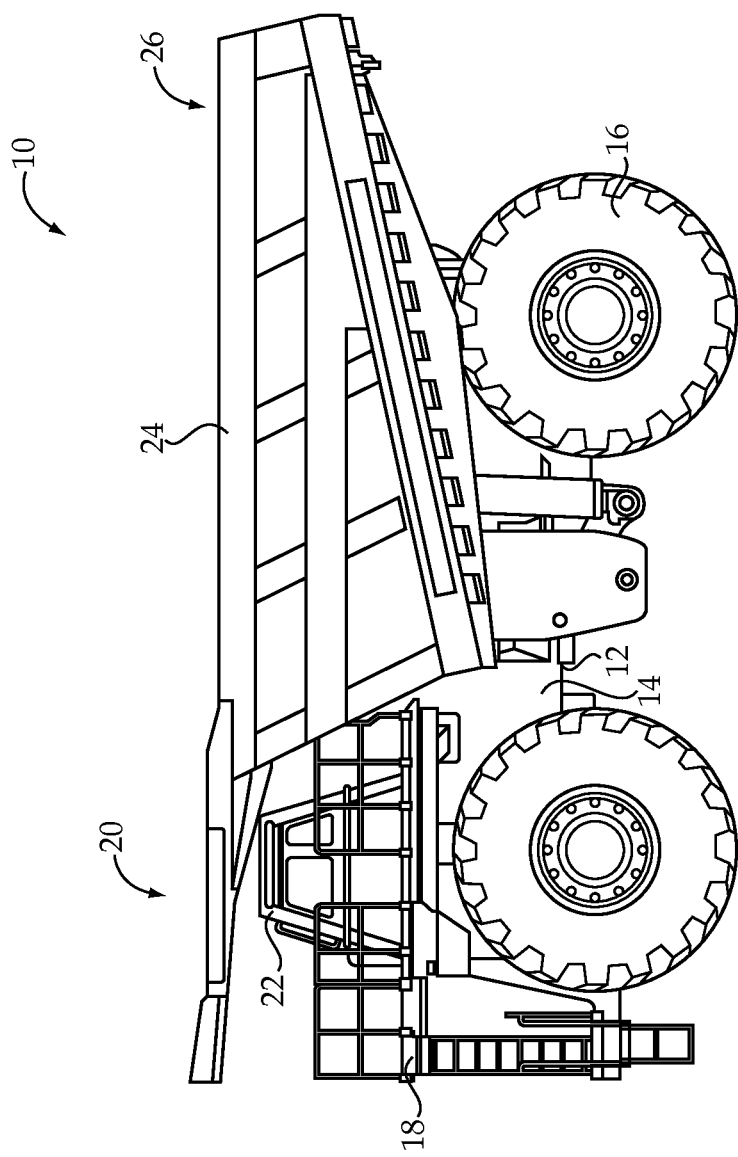
FIG. 1 is a side diagrammatic view of an electric drive machine, according to one embodiment of the present disclosure.

An exemplary embodiment of a machine 10 is shown generally in FIG. 1. The machine 10 may be a mining truck, as shown, or any other off-highway or on-highway vehicle having an electric drive system. Alternatively, however, the machine 10 may be a stationary machine, such as a generator set. Regardless, machine 10 may be referenced herein as an electric drive machine. In the illustrated embodiment, machine 10 generally includes a frame 12 having an electric drive system 14, discussed later in greater detail, supported thereon for driving a conveyance 16 of the machine 10, such as, for example, rear wheels, as shown, or ground engaging tracks. The frame 12 may also support a platform 18 positioned at a front end 20 of the machine 10 and having an operator control station 22 mounted thereon. According to the exemplary embodiment, the machine 10 may include a dump body 24 pivotally mounted on the frame 12, at a rear end 26 of the machine 10, such that the dump body 24 is movable between a hauling position, as shown, and a dumping position.

Figure 2:
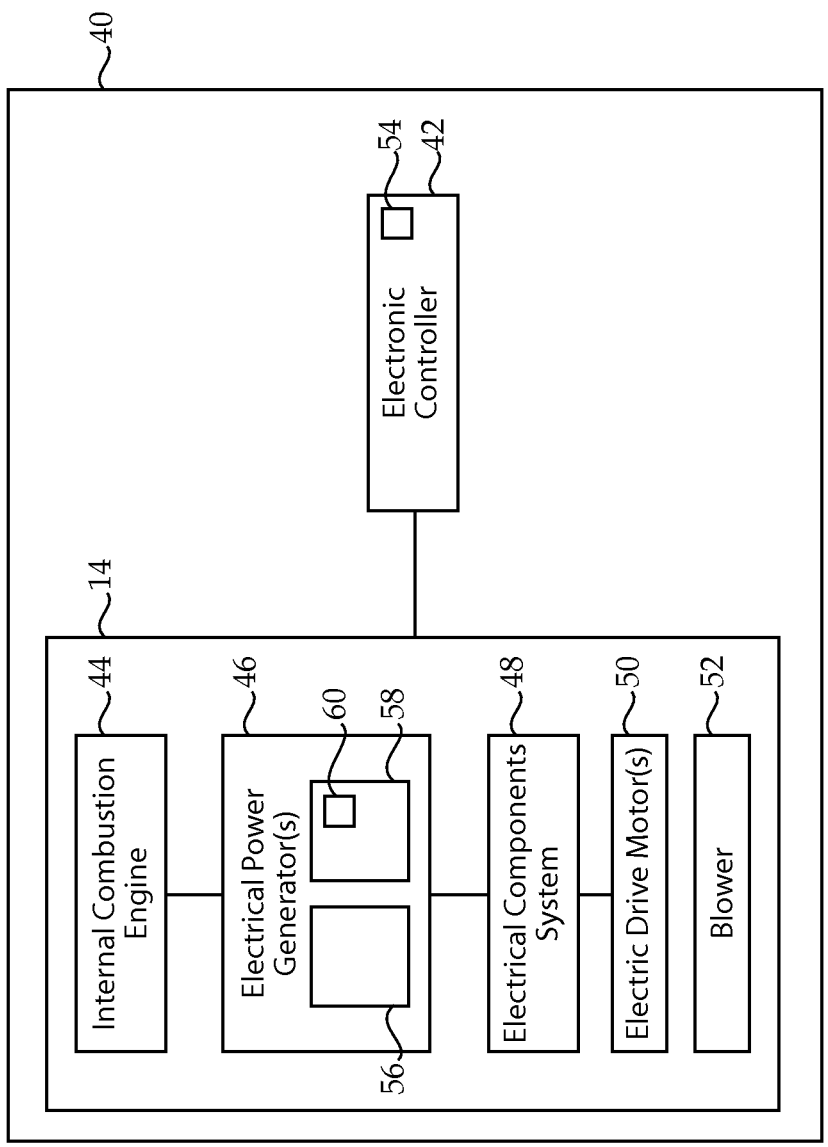
FIG. 2 is a block diagram of the electric drive system of the electric drive machine of FIG. 1, according to one embodiment of the present disclosure.

Referring to FIG. 2, an exemplary system 40 of the machine 10 may generally include the electric drive system 14 and an electronic controller 42 in control communication with the electric drive system 14. The electric drive system 14, according to an exemplary embodiment, includes an internal combustion engine 44, such as, for example, a compression or spark ignited engine, which may include a gas turbine engine, which provides mechanical power to an electrical power generator 46, such as, for example, a generator or an alternator. The electrical power generator 46, in turn, produces electrical power, such as, for example, a direct electrical current, for the electrical components system 48. The electrical components system 48 may, according to some embodiments, use an inverter and/or rectifier, or other devices, to convert and/or condition the electrical power produced by the electrical power generator 46 to provide a desired voltage and current sufficient to power one or more motors, such as, for example, electric drive motors 50. The electric drive motors 50 may, in turn, be configured to drive the conveyance 16, such as wheels or tracks, to propel the electric drive machine 10. As should be appreciated, the electrical components system 48 may, as directed by the electronic controller 42, direct the electrical power produced by the electrical power generator 46, or the power produced by the one or more electric drive motors 50, to a braking grid. The braking grid may dissipate the electrical power into heat energy that is transferred into the atmosphere.

The electric drive system 14 may also include a cooling system, such as a fluid cooling system, for cooling one or more of the components of the electric drive system 14. For example, the cooling system may be an air cooling system including a blower 52, which may be positioned adjacent, or fluidly connected to, one or more of the electrical power generator 46, the electrical components system 48, and the electric drive motors 50. According to one embodiment, the blower 52 may be configured to draw in ambient air, pressurize the air, and direct the pressurized air over the components of the electric drive system 14 that require cooling. The blower 52 may be driven using any known driving means, such as, for example, the internal combustion engine 44 or a hydraulic or electric motor, and may receive control commands from the electronic controller 42. For example, the electronic controller 42 may increase or decrease a speed of the blower 52 in response to sensed or estimated temperatures of various components of the electric drive system 14.

The electronic controller 42, and any other electronic controllers described herein, may be of standard design and may generally include a processor, such as, for example, a central processing unit, a memory 54, and an input/output circuit that facilitates communication internal and external to the electronic controller 42. The central processing unit may control operation of the electronic controller 42 by executing operating instructions, such as, for example, programming code stored in memory 54, wherein operations may be initiated internally or externally to the electronic controller 42. A control scheme may be utilized that monitors outputs of systems or devices, such as, for example, sensors, actuators, or control units, via the input/output circuit to control inputs to various other systems or devices.

The memory 54 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices located internally or externally to the electronic controller 42. One skilled in the art will appreciate that any computer-based system utilizing similar components is suitable for use with the present disclosure.

As stated above, the electronic controller 42 may be in control communication with each of the components of the electric drive system 14, and additional components and/or systems that may be internal or external to the electric drive system 14. According to the system 40 and method of the present disclosure, the electronic controller 42 is configured to determine an estimated temperature of a rotor 56 of the electrical power generator 46 at least in part by determining a rotor temperature rise estimation, compare the estimated rotor temperature to a rotor temperature threshold, and initiate an excessive temperature action if the estimated rotor temperature is greater than or equal to the rotor temperature threshold. According to some embodiments, the electronic controller 42 may also compare a sensed temperature of a stator 58 of the electrical power generator 46 to a stator temperature threshold and initiate the excessive temperature action if the sensed stator temperature is greater than or equal to the stator temperature threshold. As such, and according to additional embodiments, the electronic controller 42 may also be in communication with a stator temperature sensor 60.

Figure 3:
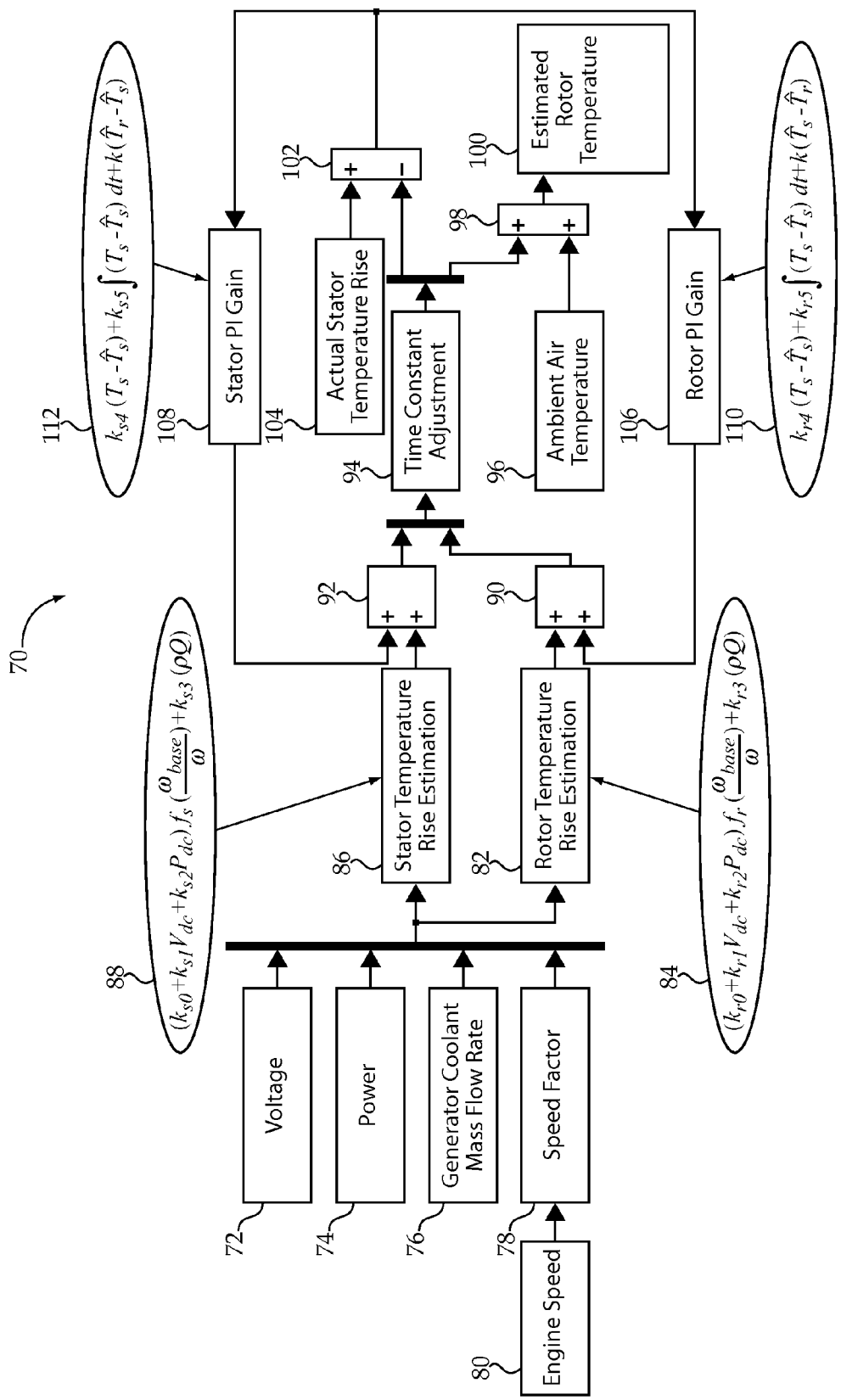
FIG. 3 is a block diagram of a generator thermal model, according to one aspect of the present disclosure.

According to a specific embodiment, the electronic controller 42 may be configured to determine the estimated rotor temperature based on a generator thermal model 70, shown in FIG. 3. As shown, the generator thermal model 70 may receive a voltage 72 of the electrical power generator 46, a power 74 of the electrical power generator 46, and a generator coolant mass flow rate 76. The voltage 72 may be measured or determined using any known device or method for measuring voltage, such as, for example, a voltmeter. According to one example, the voltage 72 may be measured in DC link, using the output of the electrical power generator 46 and a rectifier. The power 74 may, for example, be calculated by multiplying the voltage measurement by a current measurement, and converting the results to power units. The generator coolant mass flow rate 76 may be calculated from the density of the fluid, such as air, being used as a cooling medium, the cross sectional area through which the fluid is flowing, and its velocity relative to the electrical power generator 46. As should be appreciated, the air flow rate may be proportional to a speed of the blower 52. According to one embodiment, the generator thermal model 70 may also receive a speed factor 78, discussed below, which may be derived from an engine speed 80.

The electronic controller 42 may calculate a rotor temperature rise estimation 82, wherein a "temperature rise" as used herein corresponds to a temperature increase relative to ambient temperature, using a rotor temperature rise estimation algorithm 84. Specifically, the rotor temperature rise estimation 82 may correspond to the following equation: $(k_{r0}+k_{r1}V_{dc}+k_{r2}P_{dc})f_r(\omega_{base}/\omega)+k_{r3}(\rho Q)$, where $V_{dc}$ corresponds to voltage 72, $P_{dc}$ corresponds to power 74, and $\rho Q$ corresponds to generator coolant mass flow rate 76. As shown, the rotor temperature rise estimation algorithm 84 may be linear with respect to the voltage 72, power 74, and generator coolant mass flow rate 76, and may be multiplied by application, or machine, specific constants $k_{r0}$, $k_{r1}$, $k_{r2}$, $k_{r3}$, discussed in greater detail below.

Additionally, the voltage 72, power 74, and generator coolant mass flow rate 76 may be adjusted based on the speed factor 78. The speed factor 78, $f_r(\omega_{base}/\omega)$, may represent a deviation of engine speed 80 from a predetermined base speed. The predetermined base speed may represent a relatively constant base speed at which the machine 10 typically operates, such as, for example, 1800 RPMs. As should be appreciated, some machines, such as machine 10, are designed and configured to operate at a relatively constant base speed in order to provide a relatively constant amount of power. Typically, an operator will start the machine 10, set the engine to the base speed, and perform any necessary or desired operations. Thus, a majority of the operations of machine 10, and similar machines, are performed at the constant based speed. Deviations from the base speed are relatively rare, occurring, for example, when the machine 10 is being operated but is not performing typical duty cycles or when the machine 10 requires a surge of power, such as when lifting a full load.

In addition, the electronic controller 42 may calculate a stator temperature rise estimation 86 using a stator temperature rise estimation algorithm 88, which may be similar to the rotor temperature rise estimation algorithm 84 described above. The stator temperature rise estimation 86 may correspond to the following equation: $(k_{s0}+k_{s1}V_{dc}+k_{s2}P_{dc})f_s(\omega_{base}/\omega)+k_{s3}(\rho Q)$, where $V_{dc}$ corresponds to voltage 72, $P_{dc}$ corresponds to power 74, and $\rho Q$ corresponds to generator coolant mass flow rate 76. As shown, the stator temperature rise estimation algorithm 88 may also be linear with respect to the voltage 72, power 74, and generator coolant mass flow rate 76, and may be multiplied by application, or machine, specific constants $k_{s0}$, $k_{s1}$, $k_{s2}$, $k_{s3}$, discussed in greater detail below. Additionally, the voltage 72, power 74, and generator coolant mass flow rate 76 may be adjusted based on the speed factor 78, $f_s(\omega_{base}/\omega)$.

Each of the algorithms 84 and 88, as shown, include constants k that are specific to the electric drive machine 10 and derived using actual test data. Specifically, tests may be run to gather data to determine thermal sensitivities of the rotor 56 and stator 58 to changes in different parameters, such as, for example, the voltage 72, power 74, generator coolant mass flow rate 76, and engine speed 80. For example, when testing the thermal sensitivities of the rotor 56 to voltage 72, the voltage 72 may be changed while the other parameters remain unchanged. A rotor temperature sensor may be used to evaluate the results. Similar tests may be performed relative to each of the power 74, generator coolant mass flow rate 76, engine speed 80, and any additional parameters to be tested. Initial data gathering, according to the present disclosure, revealed that a linear equation, incorporating constants k, may produce accurate results for the purposes described herein. The linear equation may produce results that are most accurate for operation of the machine 10 at the predetermined base speed; however, as described herein, adjustments for deviations of engine speed from the predetermined base speed may be made. The constants k may be determined using standard functions, as are well known to those skilled in the art, based on the data collected for machine 10.

As should be appreciated, the calculation of rotor temperature rise estimation 82 using rotor temperature rise estimation algorithm 84 and the calculation of stator temperature rise estimation 86 using stator temperature rise estimation algorithm 88 may represent an open loop, or feedforward, model for determining the estimated rotor temperature and, according to some embodiments, the estimated stator temperature, respectively. According to the present disclosure, both estimations may be adjusted according to a time constant and a feedback loop, as will be described below. For example, adjustments may be made to the rotor temperature rise estimation 82 and the stator temperature rise estimation 86 at adjustment boxes 90 and 92, respectively.

At 94, the rotor temperature rise estimation 82 may be adjusted based on a time constant representative of a rotor temperature increase delay. The time constant adjustment 94 may represent a lag in temperature change that is specific to machine 10. For example, the rotor temperature increase delay, which is unique to system 40, may be based on test data and may represent how quickly the rotor 56, or electrical power generator 46, changes in temperature. Uniqueness is a function of mass properties, component configuration, materials, and other factors that may be difficult to impossible to accurately model, thus necessitating actual test data. The stator temperature rise estimation 86 may also be adjusted based on the time constant adjustment 94, representative of a stator temperature increase delay. The stator temperature increase delay may also be based on test data and may represent how quickly the stator 58, or electrical power generator 46, changes in temperature.

After the time constant adjustment 94, the rotor temperature rise estimation, first calculated at 82, may be added to an ambient air temperature 96, at adjustment box 98, to arrive at an estimated rotor temperature 100. In addition, although not shown in FIG. 3, the stator temperature rise estimation, first calculated at 86, may be added to an ambient air temperature to arrive at an estimated stator temperature. For example, it may be desirable to determine the estimated stator temperature during occasions when the stator temperature sensor 60 has failed. The stator temperature rise estimation may be adjusted, at adjustment box 102, based on an actual stator temperature rise 104. For example, the actual stator temperature rise 104 may be calculated using the stator temperature sensor 60, which may be a standard sensor as is known in the art, shown in FIG. 2.

The difference between the stator temperature rise estimation, first calculated at 86, and the actual stator temperature rise 104, as determined based on the temperature sensor 60, may represent a stator temperature estimation error. The stator temperature estimation error may be used as a rotor proportional-integral (PI) gain 106 and a stator PI gain 108 to adjust the rotor temperature rise estimation at adjustment box 90 and the stator temperature rise estimation at adjustment box 92, respectively. Specifically, the rotor temperature rise estimation may be adjusted using error adjustment algorithm 110, while the stator temperature rise estimation may be adjusted using error adjustment algorithm 112. As should be appreciated, adjustments to the rotor temperature rise estimation and the stator temperature rise estimation based on the stator temperature estimation error represent the feedback term of the generator thermal model 70.

The error adjustment algorithm 110 may correspond to the following equation: $k_{r4}(T_s-\hat{T}_s)+k_{r5}\int(T_s-\hat{T}_s)\,dt+k(\hat{T}_s-\hat{T}_r)$, where $T_s$ corresponds to the actual stator temperature rise 104, $\hat{T}_s$ corresponds to the stator temperature rise estimation, first calculated at 86, $\hat{T}_r$ corresponds to the rotor temperature rise estimation, first calculated at 82, and constants $k_{r4}$ and $k_{r5}$ correspond to machine specific constants calculated using actual test data, as described above. Constant k is based on the assumption that one of the rotor 56 and stator 58 will dissipate heat from the hotter of the two components to the other. The error adjustment algorithm 112 may correspond to the following equation: $k_{s4}(T_s-\hat{T}_s)+k_{s5}\int(T_s-\hat{T}_s)dt+k(\hat{T}_r-\hat{T}_s)$, where constants $k_{s4}$ and $k_{s5}$ correspond to data derived constants related specifically to the stator 58.

As shown, the rotor PI gain 106, which is based on the actual stator temperature rise 104 as determined by the stator temperature sensor 60, may be used to adjust the rotor temperature rise estimation 82, while the stator PI gain 108 may be used to adjust the stator temperature rise estimation 86. However, if the stator temperature sensor 60 is not used, or fails, the rotor temperature rise estimation 82 may be adjusted based on the time constant adjustment 94 and added to the ambient air temperature 96 to arrive at the estimated rotor temperature 100. Further, an estimated stator temperature may be calculated by adjusting the stator temperature rise estimation 86 using time constant adjustment 94 and adding it to an ambient air temperature. Thus, according to some embodiments, only the feedforward term of the generator thermal model 70 may be used to calculate one or both of the estimated rotor temperature 100 and the estimated stator temperature. Whereas, according to preferred embodiments, the estimated rotor temperature 100 is determined using both the feedforward and feedback terms described herein.

The estimated rotor temperature 100 may be compared to a rotor temperature threshold, which may be based on a manufacturer suggested temperature threshold. For example, a manufacturer suggested temperature threshold of both the rotor 56 and the stator 58 may be 180 degrees Celsius. This temperature may represent a temperature at which the insulation on wiring of the electrical power generator 46 begins to degrade, or any other thermal factors that may lead to damage, premature aging, or failure of the electrical power generator 46. According to one embodiment, the rotor temperature threshold may be a temperature that is less than the manufacturer suggested temperature threshold, but close enough to that temperature that it is deemed advisable to warn an operator of the machine 10. The electronic controller 42 may initiate an excessive temperature action if the estimated rotor temperature 100 is greater than or equal to the rotor temperature threshold. For example, it may be desirable to display an excessive temperature indication, such as a warning light, in the operator control station 22 of the machine 10 if the estimated rotor temperature 100 is greater than or equal to the rotor temperature threshold. The electronic controller 42 may similarly be configured to initiate the excessive temperature action if the estimated stator temperature, or actual stator temperature as determined by the stator temperature sensor 60, is greater than or equal to a stator temperature threshold, which may be selected in a manner similar to that described with respect to the rotor temperature threshold.

According to some embodiments, it may be desirable to compare the estimated rotor temperature 100 to a second rotor temperature threshold, and initiate a second excessive temperature action if the estimated rotor temperature 100 is greater than or equal to the second rotor temperature threshold. The second excessive temperature action may also be a warning light, or other visual indication, displayed in the operator control station 22 and, further, may be initiated at a temperature that is closer to the manufacturer suggested temperature threshold than the rotor temperature threshold described above. Specifically, the second rotor temperature threshold may represent a temperature that is higher than the rotor temperature threshold described above. As should be appreciated, the electronic controller 42 may be configured to compare the estimated stator temperature, or actual stator temperature, to a second stator temperature threshold and initiate the second excessive temperature action if the estimated, or actual, stator temperature is greater than or equal to the second stator temperature threshold.

Although warning lights or other visual indications are disclosed, it should be appreciated that the excessive temperature actions may include any of a number of actions taken in response to excessive generator temperatures. For example, it may be desirable to issue warnings and/or commands to the machine operator that may vary based on the particular threshold that has been reached. Specifically, according to one example, the electronic controller 42 may first display a warning that the electrical power generator 46 is operating at an excessive temperature and may next issue a command to the operator to shut down operation of the machine 10 so that the electrical power generator 46 may cool down. Alternatively, or additionally, the electronic controller 42 may initiate an action, such as automatically shutting down the electrical power generator 46 or limiting a speed of the internal combustion engine 44, in response to excessive generator temperatures.

In addition, the electronic controller 42 may be configured to log any or all of the excessive temperature actions described above in the memory 54 of the electronic controller 42. The electronic controller 42 may also be configured to store a maximum temperature of the rotor 56 and stator 58 per a selected period of time. Although specific examples are given, it should be appreciated that the electronic controller 42 may be configured to store any useful data and/or initiate any desirable actions regarding the monitoring of generator thermal status, which may be based on the estimated rotor temperature 100 or the estimated, or actual, stator temperature. Stored temperature history data may be downloaded at the time of machine servicing or may be made instantaneously available to a remote location via known communication strategies.

INDUSTRIAL APPLICABILITY

The present disclosure finds potential application in any machine that utilizes an electric drive system having an electrical power generator. Further, the disclosure may be specifically applicable to an electric drive machine that does not utilize a rotor temperature sensor for determining a rotor temperature of the electrical power generator. However, as described above, applicable test data requires a test machine or system that utilizes an actual rotor temperature sensor. Yet further, the present disclosure may be specifically applicable to machines that operate at or near a constant base speed.

Referring generally to FIGS. 1-3, an electric drive system 14 of a machine 10 may include an internal combustion engine 44 coupled to an electrical power generator 46, such as, for example, a generator or an alternator. The electrical power generator 46, in turn, produces electrical power, such as, for example, a direct electrical current, for the electrical components system 48. The electrical components system 48 may provide electrical power to one or more motors, such as, for example, electric drive motors 50. The electric drive motors 50 may, in turn, be configured to drive the conveyance 16, such as wheels or tracks, to propel the electric drive machine 10. An electronic controller 42 may be in control communication with the electric drive system 14.

A method of operating the machine 10 may include determining an estimated temperature of a rotor 56 of the electrical power generator 46 using the electronic controller 42 at least in part by determining a rotor temperature rise estimation, comparing the estimated rotor temperature 100 to a rotor temperature threshold using the electronic controller 42, and initiating an excessive temperature action using the electronic controller 42 if the estimated rotor temperature 100 is greater than or equal to the rotor temperature threshold. The estimated rotor temperature 100 may be determined based on a generator thermal model 70, a voltage 72 of the electrical power generator 46, a power 74 of the electrical power generator 46, and a generator coolant mass flow rate 76.

More specifically, and as described above, a rotor temperature rise estimation algorithm 84, used to determine a rotor temperature rise estimation 82, may be linear with respect to the voltage 72, power 74, and generator coolant mass flow rate 76, and may be multiplied by application, or machine, specific constants $k_{r0}$, $k_{r1}$, $k_{r2}$, $k_{r3}$. The voltage 72, power 74, and generator coolant mass flow rate 76 may be adjusted based on a speed factor 78, which may represent a deviation of engine speed 80 from a predetermined based speed. The rotor temperature rise estimation 82 may then be adjusted based on a time constant representative of a rotor temperature increase delay at a time constant adjustment 94, and may, according to some embodiments, be further adjusted based on a stator temperature estimation error at rotor PI gain 106. The rotor temperature rise estimation, first calculated at 82 and later adjusted as described herein, may be added to an ambient air temperature 96, at adjustment box 98, to arrive at the estimated rotor temperature 100.

The stator temperature estimation error may be calculated by first determining a stator temperature rise estimation 86. A stator temperature rise estimation algorithm 88, used to determine the stator temperature rise estimation 86, may be linear with respect to the voltage 72, power 74, and generator coolant mass flow rate 76, and may be multiplied by application, or machine, specific constants $k_{s0}$, $k_{s1}$, $k_{s2}$, $k_{s3}$. The voltage 72, power 74, and generator coolant mass flow rate 76 may be adjusted based on the speed factor 78, which may represent a deviation of engine speed 80 from a predetermined based speed. The stator temperature rise estimation 86 may then be adjusted based on a time constant representative of a stator temperature increase delay at the time constant adjustment 94, and may be further adjusted, at adjustment box 102, based on an actual stator temperature rise 104. The difference between the stator temperature rise estimation, first calculated at 86, and the actual stator temperature rise 104, as determined based on the temperature sensor 60, may represent the stator temperature estimation error. The stator temperature estimation error, as described above, may be used to adjust the rotor temperature rise estimation and the stator temperature rise estimation According to some embodiments, the stator temperature rise estimation, first calculated at 86 and later adjusted as described herein, may be added to an ambient air temperature to arrive at the estimated stator temperature. It may be useful to determine the estimated stator temperature in embodiments that do not utilize a stator temperature sensor, such as sensor 60, or in embodiments in which the stator temperature sensor has failed. However, according to preferred embodiments, the stator temperature sensor 60 is used and the estimated rotor temperature 100 is determined using both the feedforward and feedback terms, as described herein. According to either embodiment, it may be desirable to compare the estimated or sensed stator temperature to a stator temperature threshold and initiate the excessive temperature action if the estimated or sensed stator temperature is greater than or equal to the stator temperature threshold.

It should be appreciated that the system and method of the present disclosure may provide a preferable means for determining the estimated rotor temperature, particularly in embodiments that do not utilize a rotor temperature sensor. In addition, the system and method described herein may provide a preferable means for determining the estimated stator temperature in embodiments that do not utilize a stator temperature sensor or in the event of stator temperature sensor failure. In the preferred embodiments utilizing a stator temperature sensor, the system and method of the present disclosure may provide improved accuracy of the estimated rotor temperature by adjusting for stator temperature estimation error. By monitoring the estimated rotor temperature and estimated, or actual, stator temperature, warnings may be provided or actions may be taken to reduce operation of the electrical power generator 46 at excessive temperatures, thus reducing the likelihood of generator damage and/or failure. In addition, by more accurately estimating the rotor temperature, it may be possible to improve efficiency by continuing to operate the machine at times when, without an accurate estimate of rotor temperature, excessive rotor temperatures were incorrectly determined.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An electric drive machine, comprising:
an electric drive system including an internal combustion engine and an electrical power generator coupled to the internal combustion engine; and
an electronic controller in control communication with the electric drive system and configured to determine an estimated temperature of a rotor of the electrical power generator at least in part by determining a rotor temperature rise estimation, compare the estimated rotor temperature to a rotor temperature threshold, and initiate an excessive temperature action if the estimated rotor temperature is greater than or equal to the rotor temperature threshold, wherein the estimated rotor temperature is based on a generator thermal model receiving as input at least one of a voltage of the electrical power generator and a power of the electrical power generator.

2. The electric drive machine of claim 1, wherein the electronic controller is configured to determine the estimated rotor temperature based on the generator thermal model, the voltage of the electrical power generator, the power of the electrical power generator, and a generator coolant mass flow rate.

3. The electric drive machine of claim 2, wherein the generator thermal model includes a feedforward term and a feedback term.

4. The electric drive machine of claim 2, wherein the generator thermal model includes a rotor temperature rise estimation algorithm used to calculate the rotor temperature rise estimation, wherein the rotor temperature rise estimation algorithm is linear with respect to the voltage, power, and generator coolant mass flow rate.

5. The electric drive machine of claim 4, wherein the voltage, power, and generator coolant mass flow rate are adjusted based on a speed factor, wherein the speed factor represents a deviation of engine speed from a predetermined base speed.

6. The electric drive machine of claim 5, wherein the rotor temperature rise estimation is adjusted based on a time constant representative of a rotor temperature increase delay.

7. The electric drive machine of claim 6, wherein the electronic controller is further configured to adjust the rotor temperature rise estimation based on a stator temperature estimation error, wherein the stator temperature estimation error corresponds to a difference between a stator temperature rise estimation and an actual stator temperature rise.

8. The electric drive machine of claim 7, wherein the electronic controller is further configured to determine the estimated rotor temperature by adding the rotor temperature rise estimation and an ambient air temperature.

9. The electric drive machine of claim 1, wherein the electronic controller is further configured to log the excessive temperature action in a memory of the electronic controller.

10. A method of operating an electric drive machine, the electric drive machine having an electric drive system including an internal combustion engine and an electrical power generator coupled to the internal combustion engine, and an electronic controller in control communication with the electric drive system, the method including the steps of:
determining an estimated temperature of a rotor of the electrical power generator using the electronic controller at least in part by determining a rotor temperature rise estimation based on a generator thermal model receiving as input at least one of a voltage of the electrical power generator and a power of the electrical power generator;
comparing the estimated rotor temperature to a rotor temperature threshold using the electronic controller; and
initiating an excessive temperature action using the electronic controller if the estimated rotor temperature is greater than or equal to the rotor temperature threshold.

11. The method of claim 10, further including determining the estimated rotor temperature based on the generator thermal model, the voltage of the electrical power generator, the power of the electrical power generator, and a generator coolant mass flow rate.

12. The method of claim 11, further including determining the rotor temperature rise estimation based on a rotor temperature rise estimation algorithm of the generator thermal model, wherein the rotor temperature rise estimation algorithm is linear with respect to the voltage, power, and generator coolant mass flow rate.

13. The method of claim 12, further including adjusting the voltage, power, and generator coolant mass flow rate based on a speed factor, wherein the speed factor represents a deviation of engine speed from a predetermined based speed.

14. The method of claim 13, further including adjusting the rotor temperature rise estimation based on a time constant representative of a rotor temperature increase delay.

15. The method of claim 14, further including adjusting the rotor temperature rise estimation based on a stator temperature estimation error, wherein the stator temperature estimation error corresponds to a difference between a stator temperature rise estimation and an actual stator temperature rise.

16. The method of claim 15, further including determining the estimated rotor temperature by adding the rotor temperature rise estimation and an ambient air temperature.

17. The method of claim 10, wherein the initiating step includes displaying an excessive temperature indication in an operator control station of the electric drive machine if the estimated rotor temperature is greater than or equal to the rotor temperature threshold.

18. The method of claim 10, further including:
comparing the estimated rotor temperature to a second rotor temperature threshold; and
initiating a second excessive temperature action if the estimated rotor temperature is greater than or equal to the second rotor temperature threshold.

19. The method of claim 10, further including logging the excessive temperature action in a memory of the electronic controller.

20. The method of claim 10, further including:
sensing a temperature of a stator of the electrical power generator;
comparing the sensed stator temperature to a stator temperature threshold using the electronic controller; and
initiating the excessive temperature action using the electronic controller if the sensed stator temperature is greater than or equal to the stator temperature threshold.

* * * * *